(12) United States Patent
Szalony et al.

(10) Patent No.: US 7,083,538 B2
(45) Date of Patent: Aug. 1, 2006

(54) POWER TRANSMISSION WITH ELECTROMECHANICAL ACTUATOR

(75) Inventors: Norman Szalony, Brighton, MI (US); James Foukes, Commerce Township, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 10/314,757

(22) Filed: Dec. 9, 2002

(65) Prior Publication Data

US 2004/0110593 A1    Jun. 10, 2004

(51) Int. Cl.
*F16H 48/06*    (2006.01)
*F16D 27/14*    (2006.01)

(52) U.S. Cl. .................. 475/149; 192/38; 192/84.8; 475/311

(58) Field of Classification Search ............ 192/38, 192/45, 47, 84.8, 27; 188/82.84, 77 R; 475/154, 311, 284
See application file for complete search history.

(56) References Cited

U.S. PATENT DOCUMENTS

| | | |
|---|---|---|
| 1,115,221 A | 10/1914 | Lyon |
| 1,462,740 A | 7/1923 | Cotal |
| 1,604,297 A | 10/1926 | Morgan |
| 1,618,915 A | 2/1927 | Constantinesco |
| 2,785,782 A | 3/1957 | Dodge |
| 3,006,220 A | 10/1961 | Feaster |
| 3,021,925 A | 2/1962 | Osborne |
| 3,150,750 A | 9/1964 | Georges |
| 3,368,834 A | 2/1968 | Stratienko |
| 4,019,400 A | 4/1977 | Stump |
| 4,341,294 A | 7/1982 | Kerr |
| 4,485,692 A | 12/1984 | Moore et al. |
| 4,539,856 A | 9/1985 | Frost |
| 4,696,205 A | 9/1987 | Marks |
| 4,725,259 A | 2/1988 | Miyata |
| 5,056,636 A * | 10/1991 | Lederman ............. 192/45 |
| 5,067,598 A | 11/1991 | Ritter et al. |
| 5,103,950 A | 4/1992 | Ito et al. |
| 5,152,726 A * | 10/1992 | Lederman ........... 188/82.84 |
| 5,167,592 A | 12/1992 | Sakamoto |
| 5,588,928 A | 12/1996 | Koivunen |
| 5,617,937 A | 4/1997 | Zettner et al. |
| 5,638,931 A | 6/1997 | Kerr |
| 6,019,697 A * | 2/2000 | Colletti ................ 475/285 |
| 6,056,659 A | 5/2000 | McCarthy et al. |
| 6,071,208 A | 6/2000 | Koivunen |
| 6,092,635 A | 7/2000 | McCarthy et al. |
| 6,112,863 A * | 9/2000 | Colletti ................ 188/77 R |
| 6,129,189 A | 10/2000 | Kerr |
| 6,149,543 A | 11/2000 | Breen |

(Continued)

FOREIGN PATENT DOCUMENTS

GB         255943       1/1926

(Continued)

*Primary Examiner*—Rodney H. Bonck
(74) *Attorney, Agent, or Firm*—David B. Kelley; MacMillan, Sobanski & Todd

(57) ABSTRACT

An automotive transmission is equipped with a variety of gears that may be combined to yield one or more output speeds as compared to an input speed. One or more electromechanical actuators is used to engage or disengage a particular desired mix of gears. The electromechanical actuator engages one mix of gears or another to set the desired ratio of input speed to output speed. The transmission may be used to provide a straight-through, an underdrive speed range, or an overdrive speed range in an automotive transmission.

12 Claims, 11 Drawing Sheets

U.S. PATENT DOCUMENTS

| | | |
|---|---|---|
| 6,244,126 B1 | 6/2001 | Brooks |
| 6,309,321 B1 | 10/2001 | Valente |
| 6,409,001 B1 * | 6/2002 | Kerr ............................ 192/44 |
| 6,427,547 B1 * | 8/2002 | Bowen ........................ 74/329 |
| 2002/0003074 A1 | 1/2002 | Kurita et al. |
| 2002/0019286 A1 * | 2/2002 | Goto et al. ................... 192/38 |
| 2002/0029948 A1 * | 3/2002 | Williams ..................... 192/72 |
| 2002/0155914 A1 * | 10/2002 | Williams et al. ............ 475/151 |
| 2002/0173401 A1 * | 11/2002 | Bowen ........................ 475/269 |
| 2003/0000796 A1 * | 1/2003 | Kawai et al. ................. 192/45 |
| 2003/0148848 A1 * | 8/2003 | Williams ..................... 192/44 |

FOREIGN PATENT DOCUMENTS

JP      4-277329 A   * 10/1992

* cited by examiner

US 7,083,538 B2

POWER TRANSMISSION WITH ELECTROMECHANICAL ACTUATOR

FIELD OF THE INVENTION

The present invention is directed to power transmission devices, and in particular to an electromechanical actuator useful for adding or removing elements of a power transmitter, including auxiliary, automatic and manual transmissions, axles, and transaxles.

BACKGROUND OF THE INVENTION

Power transmissions are complicated machines, packing many mechanical devices into ever-smaller packages in order to meet cost and weight goals. A present-day transmission may use hydraulic bands to change gearing ratios and thus speeds. A simple two-speed transmission, such as one depicted in U.S. Pat. No. 5,588,928, is used to describe the involved gear and friction elements, and their functions during gear changes. FIG. 1 depicts a transmission consisting of a simple planetary gear unit 1 having an annulus gear 2 coupled with input shaft 3, a sun gear 4 connected with brake drum 5, and a planet carrier 6 connected with output shaft 7. Planet gears 8 mesh with annulus gear 2 and sun gear 4. A self-synchronizing friction band 10 is engaged to hold the drum 5 and the sun gear 4 attached thereto stationary to set the transmission in low gear. The transmission is upshifted to direct drive by applying multi-plate clutch 9 and by disengaging the friction band 10 to lock the planetary gear set for unitary rotation.

In FIG. 2, the friction band 10 encircling the drum 5 has friction lining 11 attached to its inner surface. The band 10 also has lugs 12, 13 secured to each end of the band; one lug 12 to the apply end and another lug 13 to the reaction end. Typically, the friction band actuating system 14 is housed inside a servo chamber 15 extending transversely in a transmission case 16. The main components in the system are the apply piston 17 and the reaction piston 18. Both pistons are subjected to the same pressure regulated by an exhaust control valve 19, which is attached to the reaction piston guide rod 20, responding to the axial movement of reaction piston 18. Chamber 15 is enclosed by a servo cover 22, which includes cylindrical surfaces and oil passages for both pistons as well as an elastomer ring 24 for sealing purposes. A complicated system to apply and release hydraulic pressure causes the band or bands to contract or relax, thus engaging or releasing a drive shaft encircled by the bands. Control system 25 for the selfsynchronized friction band includes a shift valve 26 and a mode valve 27, including ball 28 and spring 29. Ball 30 with seat 23 forms another valve. Hydraulic fluid or oil is supplied and directed through a series of pistons, accumulators, and chambers to control the bands.

Such complicated devices as this brake-band actuated transmission tend to have many components that must interact in a prescribed manner for correct operation. These parts and the resulting transmission are costly. The transmissions are subject to oil leaks. Wear may occur in many parts of the transmission, including the valve seats, the pistons, and the bands themselves. What is needed is a power transmitter having fewer parts and operating in a simpler fashion to add speed ranges to a mechanical transmission. Also, what is needed is a power transmitter that will shift and transmit power with fewer components and less cost, and in which the components are capable of acting simply and reliably to deliver mechanical power.

SUMMARY

One aspect of the invention is an electromechanical actuator for engaging a shaft. The electromechanical actuator comprises a housing that is fixedly mounted. Within the housing is a plurality of roller elements, such as roller bearings or needle bearings. There is a split ring around the shaft and within the housing, the ring urging the roller elements against an inside surface of the housing. The electromechanical actuator also comprises an engaging device, wherein the engaging device urges the split ring against the shaft. Another aspect of the invention is a method of manufacturing an electromechanical actuator. The method comprises molding a cage having a plurality of separating elements and a surface for engaging an engaging device. The method also comprises manufacturing an outer race and an inner race, at least one of the outer race and inner race having a cammed surface, and the method also comprises manufacturing a plurality of roller elements.

Another aspect of the invention is an auxiliary transmission, such as a transmission for an automobile or a truck. The auxiliary transmission comprises an input shaft, an output shaft, and a housing. The auxiliary transmission also comprises a planetary transmission connected with the shafts, and a sleeve connected with the planetary transmission. The auxiliary transmission also comprises an electromechanical actuator having a cammed surface, the actuator in rotatable contact with the sleeve and fixed to the housing. The auxiliary transmission has a first gear ratio when the sleeve rotates and a second gear ratio when the electromechanical actuator is engaged and prevents rotation of the sleeve.

Another aspect of the invention is an actuator, the actuator comprising an inner race for connecting with a first drive and an outer race for connecting with a second drive. The actuator further comprises a cage and a plurality of roller elements, the cage between the inner and outer races. At least one of an inner surface of the outer race and an outer surface of the inner race is a cammed surface. Another aspect of the invention is a two-speed transmission. The two-speed transmission comprises an input shaft and an output shaft, and a planetary transmission connecting the input shaft and the output shaft. The two-speed transmission also comprises an electromechanical actuator having a cammed surface and an engagement device for rotating a portion of the electromechanical actuator. The transmission has a first output ratio when the electromechanical actuator is in a first position and has a second output ratio when the electromechanical actuator is in a second position.

The electromechanical actuator of the present invention is bi-directional, that is, it may be operated with a mating shaft in either a clockwise or counter-clockwise direction of rotation. These and many other aspects and advantages of the invention will be seen in the figures and preferred embodiments of the invention described herein.

DETAILED DESCRIPTION OF THE PREFERRED EMBODIMENTS

Figure 1:
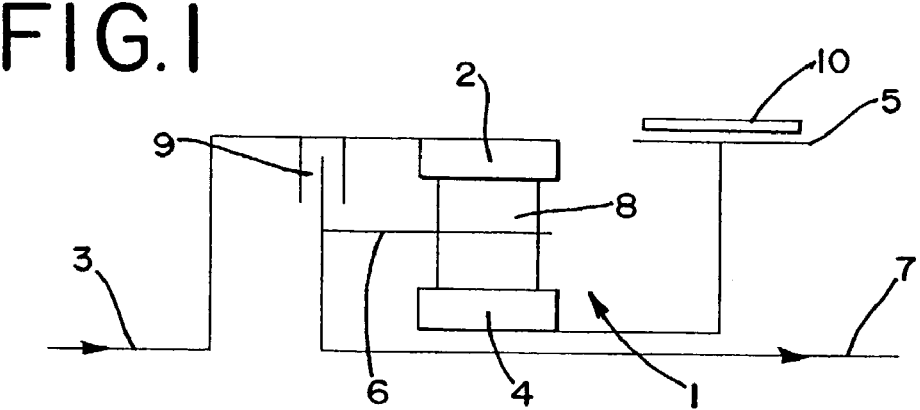
FIG. 1 is a diagrammatic representation of a prior art two-speed transmission.
Figure 2:
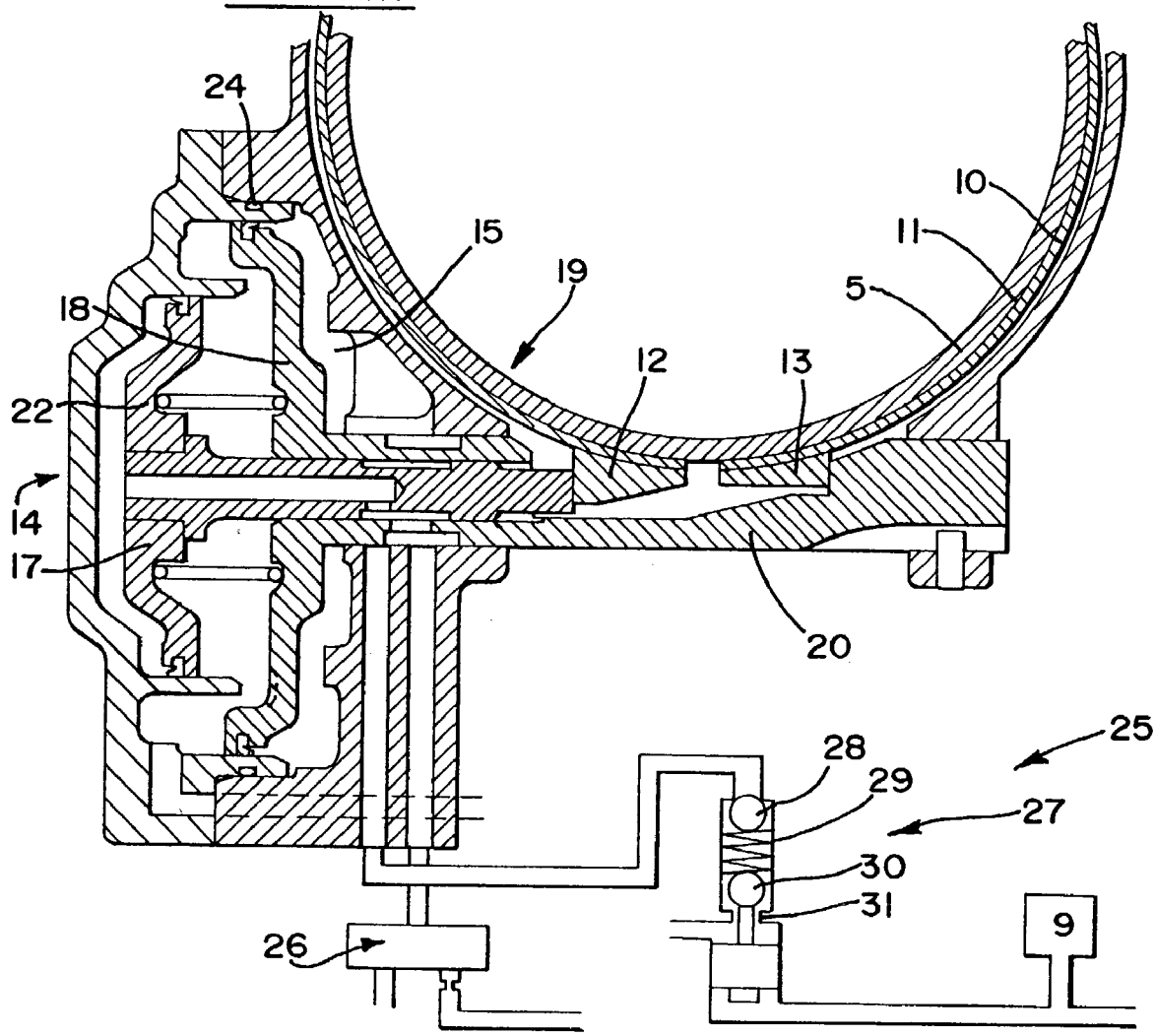
FIG. 2 is a cross-sectional view of a prior art clutch mechanism.
Figure 3:
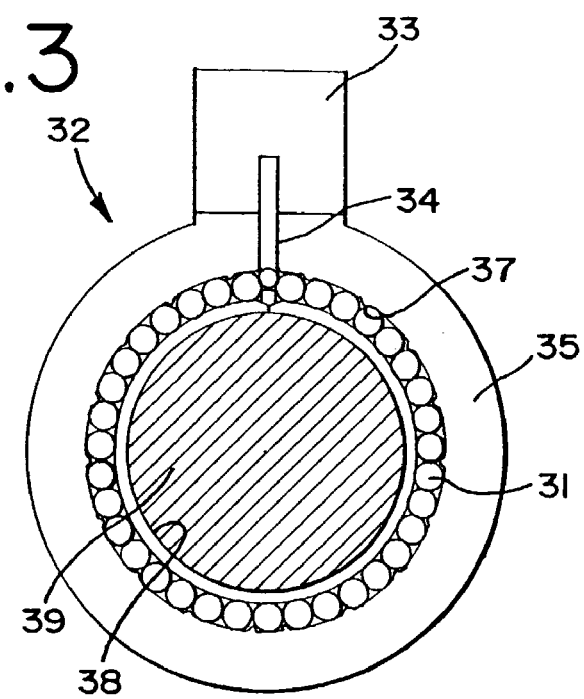
FIG. 3 is a cross-sectional view of an electromechanical actuator according to the present invention.

FIG. 3 is an embodiment of an electromechanical actuator 32 according to the present invention. The electromechanical actuator comprises an electric solenoid 33 mounted to housing 35. Roller elements 31 are contained within the housing. The roller elements roll between the housing and an inner ring 38, split along its length, so that the ring may be expanded or contracted by forces acting on the edges of the split. The electromechanical actuator acts on a shaft 39 that rotates within the split ring. When a user wishes to stop or prevent rotation of the shaft, the user actuates solenoid 33. The solenoid then plunges plunger 34 into the split ring 38 between roller elements 31. The plunger forces ring 38 to engage the rotating shaft 39, stopping the shaft if it had been rotating, or preventing rotation if the shaft was already stopped. The inner surface of the housing may have a cammed profile of slightly raised surfaces 37, gently radiused with a radius of curvature at least slightly greater than the radius of the roller elements. These raised surfaces, or arcuate surfaces, gently urge the roller elements radially inward in a circumferential motion, and thus contribute to engaging and stopping the shaft when it is rotating. Other radii of curvature may be used or added for the cammed profile on split ring 38. This electromechanical actuator may be used in conjunction with any desired shaft.

Figure 4:
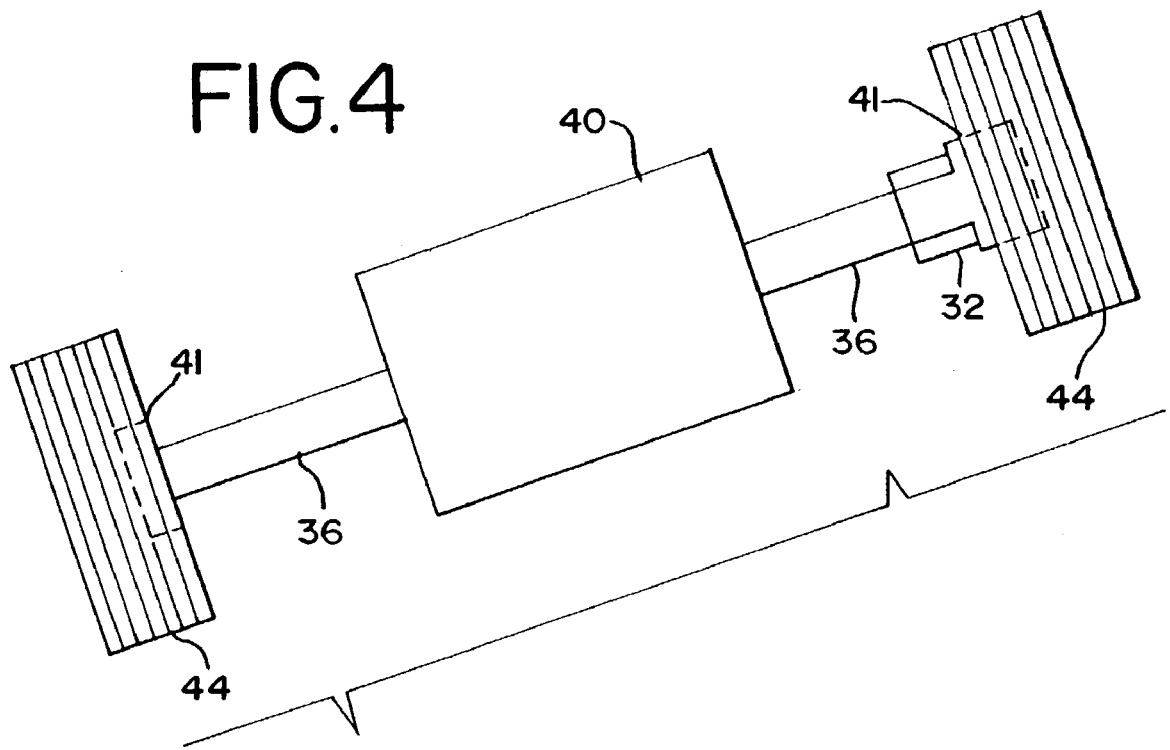
FIG. 4 is a schematic diagram of an application of the electromechanical actuator of FIG. 3.

One application is pictured in FIG. 4, in which the electromechanical actuator 32 is used as a parking brake for axle half-shafts 36. An auto has a transaxle 40 with half-shafts 36 to provide power to wheels 44. The electromechanical actuator 32 may be mounted to a non-rotating axle housing 41. During normal operation, the electromechanical actuator is not engaged, and the transaxle provides power to the wheels 44. When the car is parked, and the operator desires to engage a parking brake, the operator actuates the solenoid of electromechanical actuator 32. Plunger 34 causes interference of half-shaft 36 with the split ring 38 of the electromechanical actuator, and the auto is prevented from rolling.

The illustration is for an auto with a transaxle and two-wheel front drive, but the electromechanical actuator is usable also for rear wheels of a rearwheel drive car having a differential. The actuator housing should be mounted to a structure that does not rotate, in order to react the load upon a structure that does not move relative to the actuator housing. Instead of a solenoid-type actuator, other electromechanical devices may be used in embodiments of the present invention, such as a ballscrew, a ball-and-ramp device, and a cone friction clutch.

Figure 5:
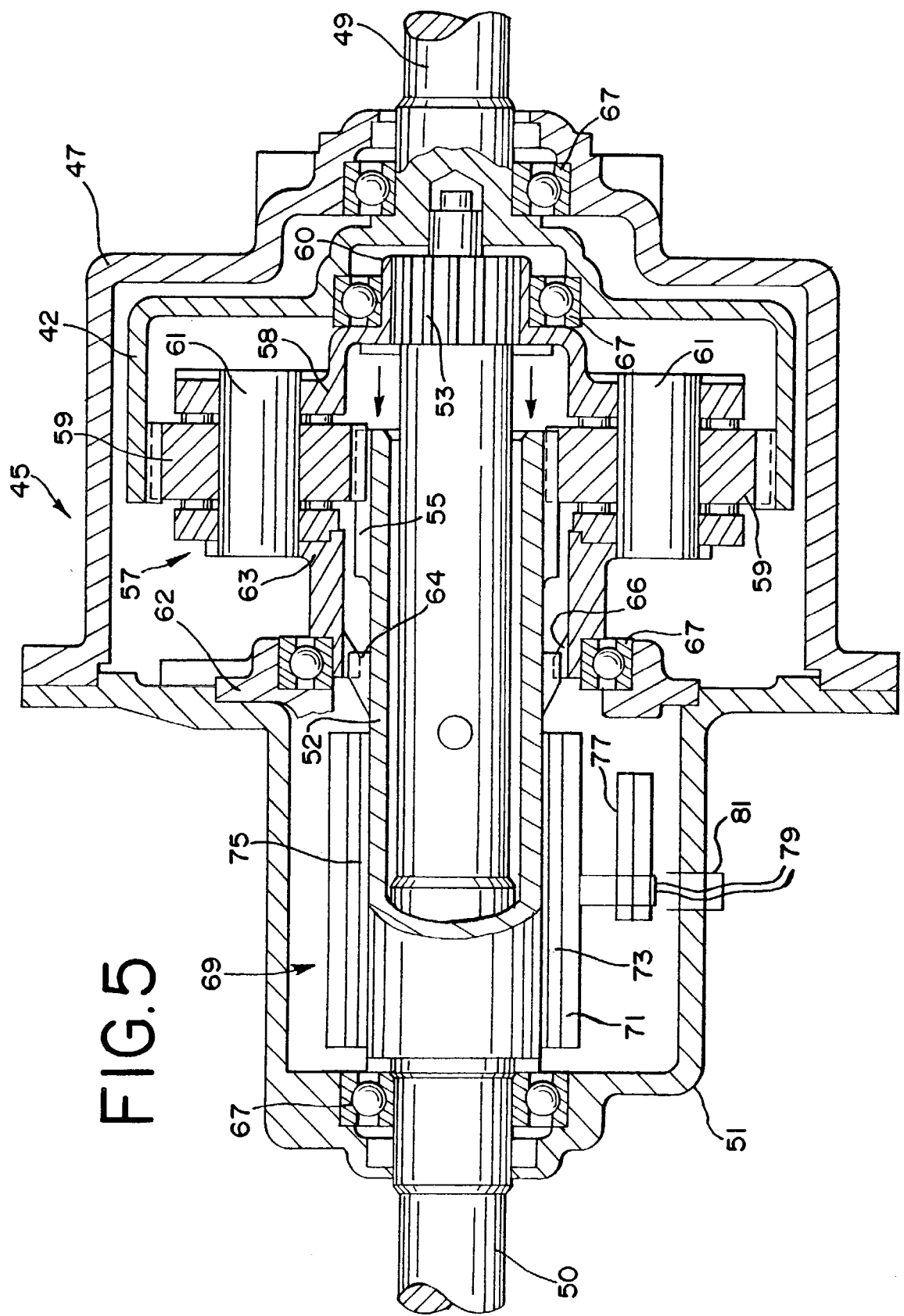
FIG. 5 is a cross-sectional view of an auxiliary transmission using an embodiment of an electromechanical actuator.

The electromechanical actuator may be used in transmission applications, such as auxiliary transmissions and multi-speed transmissions. FIG. 5 depicts a cross-section of an auxiliary transmission 45 using the electromechanical actuator 69. Auxiliary transmission 45 includes a first housing portion 47 and a second housing portion 51. The auxiliary transmission includes an input shaft 49, such as from an engine or a primary transmission of a motor vehicle or truck. Output shaft 50 typically transmits power to a differential or other power transmitter of the vehicle or truck. Input shaft 49 is fixedly connected to ring gear 42 that meshes with planetary transmission 57, and planet gears 59. Planet gears 59 rotate on planet pins 61. In one embodiment, there are four planet gears 59 rotating on four pins 61. The pins are supported by carriers 58 and 63. Planet pin 58 has an internal spline 60 and planet pin 63 has an internal spline or gear 66. The shafts and carriers in turn are mounted on anti-friction bearings 67 supported by housing 47 or 51 or housing portion 62.

Output shaft 50 mounts to housing portion 51 by bearing 67 on one end and has external splined gear 53 at the opposite end meshing with internal spline 60 from carrier 58. Sleeve 52 mounts concentric to output shaft 50 and has external spline 55 for meshing with planetary gears 59. The spline 55 acts as a sun gear in the planetary transmission 57. Sleeve 52 also has a second splined gear 64 for meshing with internal spline 66 of carrier 63. Electromechanical actuator 69 mounts concentric with and outside sleeve 52. Electromechanical actuator 69 is preferably mounted fixedly to housing 51 to prevent rotation when engaged with sleeve 52. The electromechanical actuator includes housing 71, roller elements 73 and split ring 75 adjacent sleeve 52. The electromechanical actuator also includes solenoid 77. Control wires 79 pass through housing 51 via orifice 81.

Operation of the auxiliary transmission and electromechanical actuator are as follows. Input power enters through the input shaft 49 and ring gear 42. When ring gear 42 rotates, planet gears 59 also rotate. Since there is no restraint on carriers 58 and 63, they rotate also, and thus spline 60 and sleeve 52 rotate. With spline 60 rotating, the output shaft 50 rotates also. The planetary gears are of no effect, since the entire ring assembly now rotates at the rotational speed of the input shaft, with the exception of the electromechanical actuator and its housing and controls.

When the electromechanical actuator is actuated, the split ring clamps onto sleeve 52 and prevents its rotation. Now when the input shaft 49 and ring gear 42 turn, the sleeve 52, spline 64 and spline/sun gear 55 cannot rotate. The input shaft and its ring gear continue in gear contact with the planets 59. The planets 59, their pins 61 and their carriers 58 and 63 now rotate. Planet carrier 58 with internal spline 60 is in gear contact with the output shaft 50 through its external spline 53 at the inside end of the output shaft. In this position, the gear reduction takes place through the action of the ring gear and its pitch diameter relative to the planet gears and sun gear used. In one embodiment, a gear reduction of 1.4:1 is used. Other gear ratios may also be used as desired, such as a speed increase, or overdrive.

Figure 6:
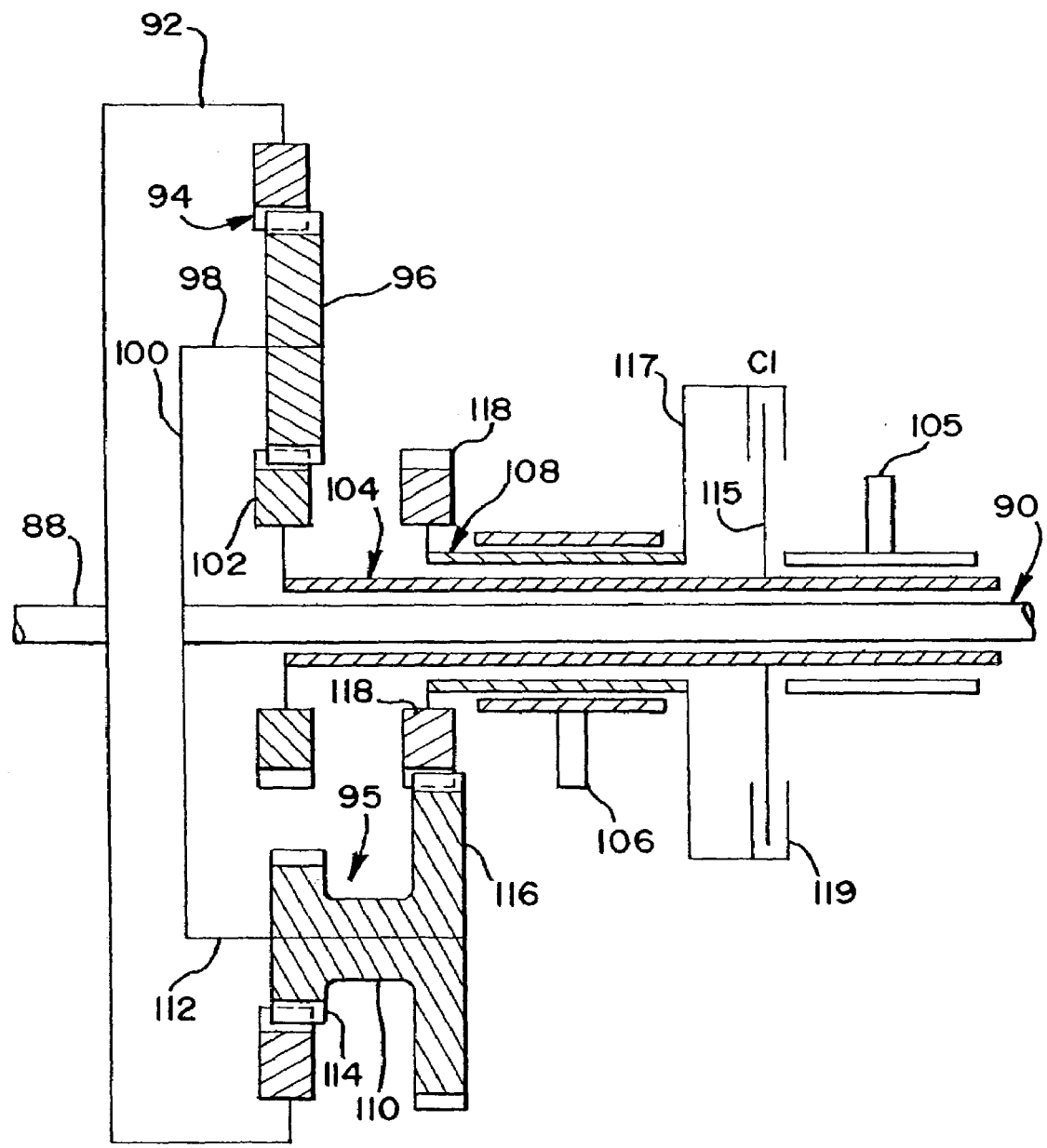
FIG. 6 is a schematic view of a three-speed transmission using embodiments of an electromechanical actuator.

FIG. 6 depicts another embodiment of the invention, its application to a multi-speed transmission. Driveshaft 88 is attached to a ring gear 92. Ring gear 92 is concentric with drive shaft 88. Ring gear 92 meshes with a planetary gear set 94 having single gears and with a planetary gear set 95 having double gear elements. Double planetary gear set 95 has an inner ring contact gear 114 that is rigidly attached to outer gear 116 by shaft 110. The diameter of the planetary gears in each gear set may be varied along with the number of teeth to alter the gear ratio as desired within the transmission. In this embodiment, planetary gear 116 is shown having a larger diameter and a greater number of teeth than the planetary gear 96, which in turn has a larger diameter and more teeth than inner planetary gear 114.

Both planetary gear sets 94 and 95 are supported by a common planet carrier 100. Planet carrier 100 is rigidly attached to and concentrically located about driven shaft 90. Planetary gear set 94 and planetary gear set 95 are rotatably attached by suitable shaft bearing assemblies 112 and 98 respectively. Rotary movement is transferred to driven output shaft 90 from ring gear 92 through either or both of planetary gear sets 94 and 95. The transfer of rotation through the planetary gear sets 94 and 95 is determined by the rotational condition of inner and outer sun gears 102 and 118, respectively, which act as speed control gears. In one preferred embodiment, sun gears 102 and 118 are the same diameter, but they may have different diameters depending on the desired gear ratios. Inner sun gear 102 meshes with the single planetary gear system 94 and is non-rotatably attached to one end of a hollow shaft 104 which is positioned about and concentrically over and is capable of rotation about, driven output shaft 90. At its opposite end, a clutch disc 115 is attached to shaft 104.

Outer sun gear 118 meshes with outer planetary gear 116 and is also attached to one end of a hollow shaft 108. Shaft 108 is positioned concentrically over shaft 104 for rotation about shaft 104. At an end opposite sun gear 118, a rotor 117 is non-rotatably attached to shaft 108. Rotor 117 also has a clutch caliper 119 for engaging clutch disk 115. An electromechanical actuator, such as cone friction clutch 105, according to the present invention is positioned over and concentric with shaft 104 and another electromechanical actuator, cone friction clutch 106 is positioned concentric with and over shaft 108. The clutch and electromechanical actuators 105 and 106 are used to control the rotation of the sun gears 102 and 118 and effect speed changes within the transmission.

When the clutch is engaged, the transmission is in direct drive, with the speed of rotation of the output shaft equaling the speed of rotation of the input shaft. With the clutch engaged, all elements of the transmission that rotate move in unison, with all shafts and planetaries rotating. Therefore, the output rotational speed will equal the input rotational speed. To engage a first underdrive of the transmission, the clutch is released and electromagnetic actuator 106 is engaged. With actuator 106 engaged, shaft 108 cannot turn and sun gear 118 is fixed in position. Therefore, when ring gear 92 turns, planetary gear set 95 rotates about sun gear 118. Rotation of planetary gear set 95 causes rotation of planet carrier 100 and also rotation of output shaft 90. Shaft 104 and sun gear 102 are free to rotate, and they rotate idly along with planetary gear set 94. The speed of the output shaft 90 is set by the ratios of the gear pitch diameters of ring gear 92, inner planet gear 114, outer planet gear 116, and outer sun gear 118.

A second underdrive speed is obtained by releasing electromagnetic actuator 106 and engaging only electromagnetic actuator 105. With electromagnetic actuator 105 engaged, shaft 104 and inner sun gear 102 cannot rotate. As ring gear 92 rotates, single planetary gear set 94 rotates about sun gear 102, which causes planet carrier 100 and output shaft 90 to rotate. Outer sun gear 118 revolves idly, as does double planetary gear set 95. The speed of the output shaft 90 is set by the ratios of the diameters of ring gear 92, planet gear 96, and inner sun gear 102. As is well known in the art, the same gears may be used in a reversing fashion to achieve an overdrive transmission by reversing the functions of the input and output shafts. In this case, a first overdrive may be obtained by actuating only electromagnetic actuator 106 and a second overdrive may be obtained by engaging only electromagnetic actuator 105.

Figure 7:
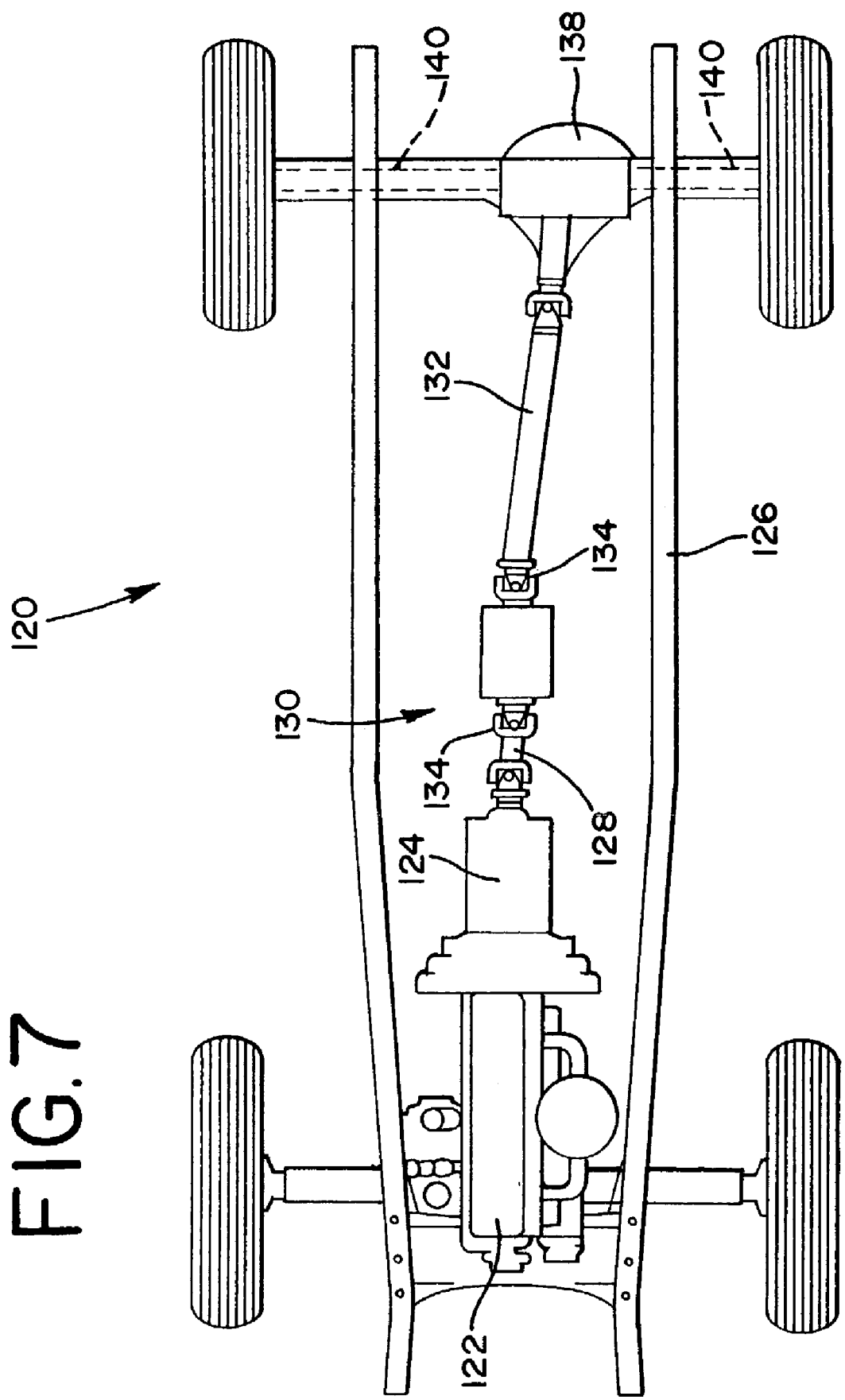
FIG. 7 is a plan view of a vehicle using a two speed transmission.

FIG. 7 is a plan view of an application using a two speed transmission 121. A motor vehicle 120, such as an automobile or truck, comprises an engine 122 and a transmission 124 mounted on a frame 126. A first drive shaft 128 transmits power from the transmission to an auxiliary transmission 121. The first drive shaft may function as an input shaft to the auxiliary transmission 121. A second drive shaft 132 carries power from the auxiliary transmission 121 to a rear differential 138 and then to wheel shafts or halfaxles 139 to power the rear wheels of the vehicle. The drive shafts may be connected to the auxiliary transmission by U-joints 134 or other joints. The auxiliary transmission 121 may be a transmission according to the embodiment of FIG. 5, or may be a simpler, 2-speed version of the embodiment of FIG. 6. Control wires from the auxiliary transmission may be routed to an electronic control unit 136, where a switch or other control is available to the operator of the vehicle.

Figure 8:
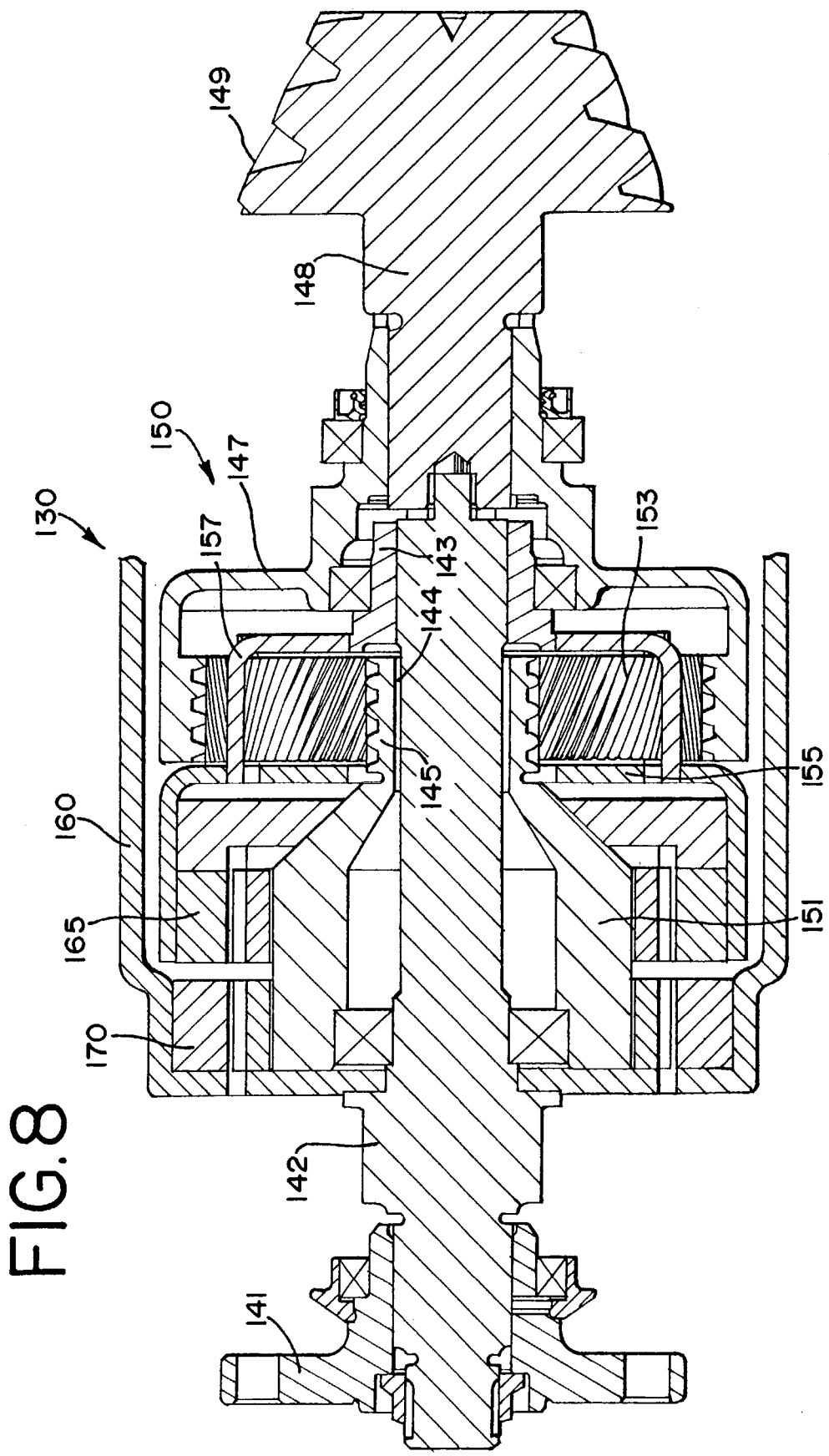
FIG. 8 is a cross-sectional view of an embodiment of a two-speed transmission having two electromechanical actuators.

A detailed view of a two-speed auxiliary transmission 130 is depicted in FIG. 8. Two-speed auxiliary transmission 130 includes a flange gear 141 and input shaft 142 having a extension 143. The transmission may also have a sun gear 145 and bushing 144. The output from the transmission includes ring gear 147 and output shaft 148 with axle pinion gear 149. A planetary transmission 150 within the two-speed transmission 130 includes sun gear 145, planet gears 153, planet pins 155 and carrier 157. The sun gear also has an extension 151 for mounting to electromechanical actuators 165 and 170. Extension 143 is fixedly linked to carrier 157.

In this embodiment, actuator 165 acts as an idler, while actuator 170 acts to shift the two-speed transmission from one gear ratio to another when an operator of the vehicle desires. The outer race of actuator 170 is in fixed contact with the housing 160, while its inner race is in rotatable contact with the gear extension 151. The outer race of actuator 165 is in fixed contact with carrier 157, while its inner race is in rotatable contact with sun gear extension 151. In this embodiment, the two-speed transmission may be operated in straight-through mode or in under-drive mode. Other embodiments may have straight-through and an overdrive mode. In straight-through mode, actuator 170 does not engage, and sun gear 145 and sun gear extension 151 rotate. Input torque from input shaft 142 drives the sun gear 145, causing the sun gear 145 and extension 151 to rotate at the input shaft speed. Extension 143, tied to planet carriers 157, also rotates, and therefore the planetary transmission 150 as a whole also rotates. Ring gear 147 rotates at the same speed as the input shaft, as does output shaft 148 and axle pinion gear 149.

An underdrive mode may be used if the planetary transmission 150 has been designed and constructed by selection of ring gear 147 and planet gears 153 so that their input/output ratios will be some desired ratio, such as 1.4:1, that is, 1 output revolution per 1.4 input revolutions, for an underdrive mode. To utilize the underdrive mode, an operator or controller actuates electromechanical actuator 170 to engage. The cage of actuator 170 rotates through a portion of a revolution, locking the inner race to the outer race through roller bearing elements, and preventing rotation of sun gear extension 151 and therefore preventing rotation of sun gear 145. When the input shaft 142 turns, sun gear extension 151 cannot rotate, nor can sun gear 145. Extension 143 rotates at the speed of the input shaft 142, as does carrier 157. This causes the planet gears 153 of the planetary transmission to rotate about the sun gear. The ring gear rotates as driven by the planet gears, driving the output shaft 148 and axle pinion gear 149 at a desired underdrive ratio, such as 1.4:1. Thus, the operator of the vehicle can select a straight-through or an underdrive mode of operation.

Figure 9:
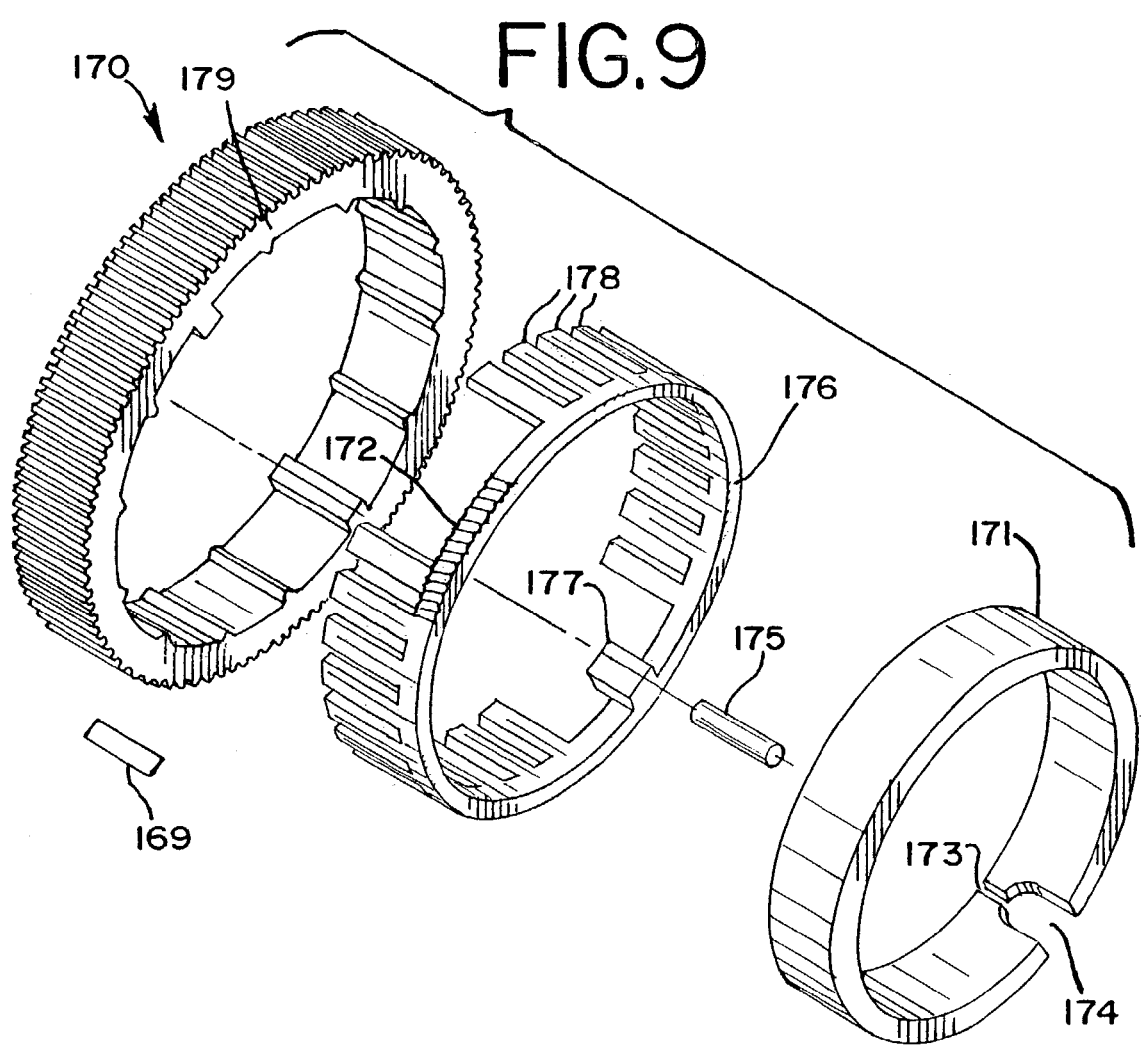
FIG. 9 is an exploded perspective view of a portion of the electromechanical actuator.

Details of the electromechanical actuator 170 are shown in FIG. 9. The actuator includes an inner race 171, a plurality of roller elements 175, a cage 176, and an outer race 179. The inner race 171 may be splined on its inner surface or otherwise designed to mate with a shaft or rotating member, such as sun gear extension 151, or the surface may be smooth. Preferably, arcuate, cammed surfaces can exist on the inner circumference of outer race 179, or the inner circumference of inner race 171 may have arcuate, cammed surfaces. The outer circumference of inner race 171 may comprise a plurality of arcuate surfaces 179 to match roller elements 175, or the outer circumference may be smooth as shown. The inner race may also include a split 173 and a notch 174 for engaging a matching tab 177 on cage 176. Cage 176 also includes a plurality of isolating members or fingers 178 for separating roller elements 175. There may be two counter opposing return springs 169 (or two pair of return springs) held within cage 176 at 180° positions, for centering the inner and outer races and the cage in a neutrallycentered, free-wheeling position. A cross-sectional view of the inner race 171 is shown in FIG. 10, and a cross-sectional view of the outer race is shown in FIG. 11.

Cage 176 is preferably molded from a strong, relatively stiff plastic material having wear-resistant qualities, or the cage may be molded from powdered metal. The cage includes a plurality of fingers 178 to separate roller elements from each other. The outer circumference may have an engagement feature 172 on a portion of its surface, such as gear teeth for a gear sector. The engagement feature is meant to engage a mechanical device to rotate the cage a few degrees, thus engaging the electromechanical actuator. While cage 170 depicts helical gear sector 172, other features that may be used to interface a mechanical device include a splined or cammed surface on the outer circumference of cage 176.

Figure 10:
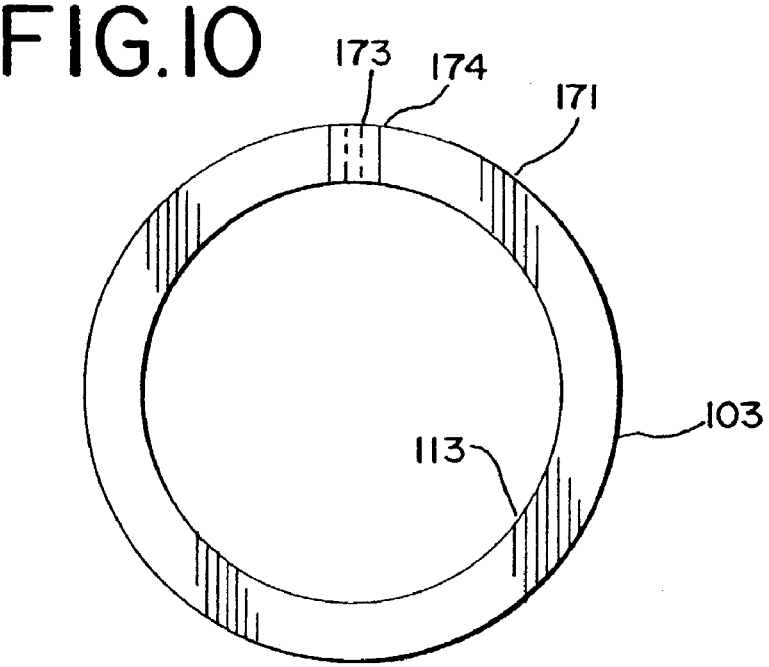
FIGS. 10–11 are cross sectional views of the inner and outer races.
Figure 11:
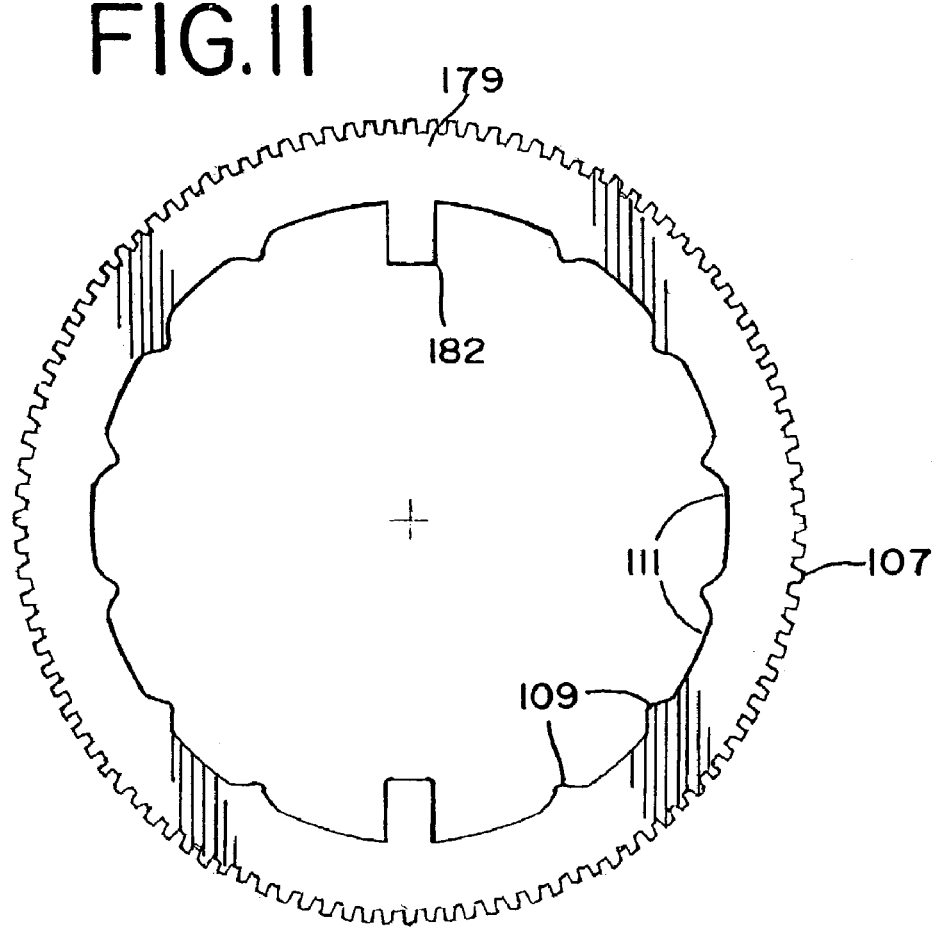

As depicted in FIG. 10, the inner race 171 has a smooth outer circumference 103 and a smooth inner circumference 113, and also has a split 173 and a notch 174. The split allows the inner race to expand slightly in a radial direction. However, the split also tends to interfere with desirable roundness of the inner race. This interference may take place both during operation and during manufacture of the inner race itself, since it is very difficult to hold roundness tolerances on a part that has been split. Therefore, the split feature should be placed on the inner ring in one of the later steps used to manufacture the race. The split may be placed by any convenient method of manufacture, such as machining, laser cutting, or water-jet cutting. The split should also be narrow, desirably from 0.001 to 0.020 inches in width, preferably from about 0.005 to about 0.010 inches. The split should also be as short as possible in length, to minimize distortion after the split has been made. One way to minimize work hardening is to leave the inner surface smooth, rather than adding cammed or arcuate surfaces, which also add distortion. The split need not be co-located circumferentially with the notch, but may be placed there, as shown in FIG. 9, for convenience. The inner race 171 also preferably has a lubrication pattern imprinted or placed onto its inner circumference 113, for interfacing with other parts.

The lubrication pattern may be small, grooved pattern for retaining small amounts of oil on the surface, such as a series of axial grooves.

FIG. 11 depicts a cross-sectional view of outer race 179. The outer circumference may have a spline 107 for interfacing to another element of the transmission, such as a housing. The inner circumference may have stops 182 to react leaf or compression springs 169 and maintain a preload on the cage and thus the actuator. The remainder of the inner circumference may include a plurality of relatively smooth surfaces 111 interrupted by raised surfaces 109 to separate the roller elements 175. The raised surfaces also act as cammed surfaces. When the cage is rotated a few degrees, the fingers force the roller elements against raised surfaces 109, thrusting the bearings radially inward and causing an engagement and lock-up between the inner and outer races. The corner radius of the raised surfaces with the inner circumference of the outer race is desirably at least somewhat larger than the radius of the roller bearing elements 175, ensuring that the roller elements will be free to translate circumferentially and to rotate. Thus, the electromechanical actuator is engaged by rotating the cage and causing engagement between the inner and outer races.

The inner race 171 may be machined from barstock or preferably made from a powdered metal. If it is made from powdered metal, the notch and split may be molded in and distortion minimized during manufacture. The cage 176 is made from metal or preferably from an engineering plastic. The engineering plastics preferably include reinforced or unreinforced nylon, phenolic, or other high-performance engineering plastics. Cages may be made from thermoplastic or thermoset materials, and processes used to make them may include injection molding, compression molding, and other plastics processes. Manufacturing and machining processes for the inner and outer races, and the roller elements, are meant to include any sort process for shaping material, including but not limited to, casting, molding, forging, and machining processes. Other manufacturing processes using in making the components of the electromechanical actuator include turning, broaching, grinding, shaping, machining and honing. Net-shape or near-net shape processes, such as powder metal compaction and sintering processes, are also included in this definition of manufacturing processes.

Figure 12:
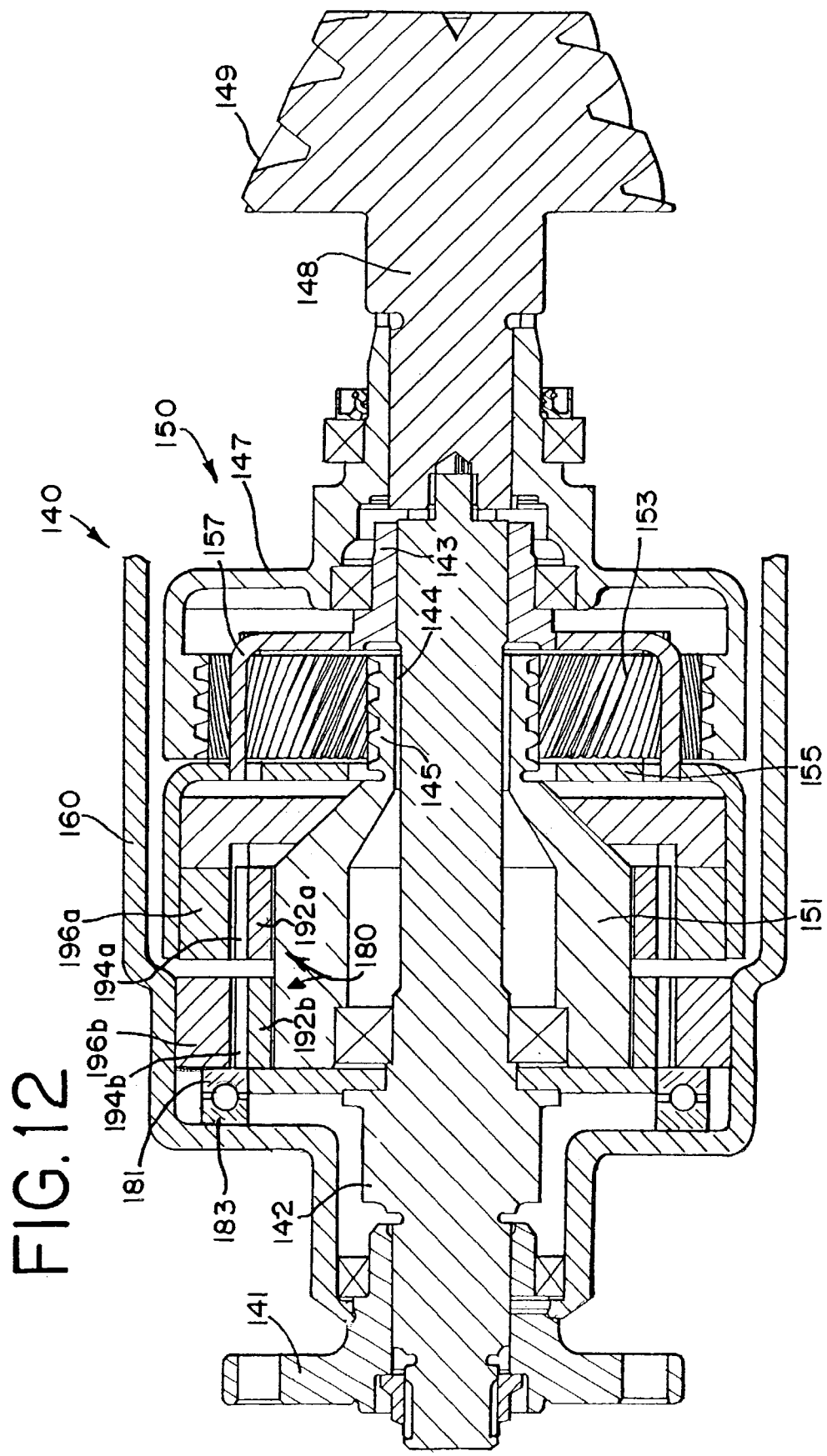
FIGS. 12–13 are cross-sectional views of embodiments of two-speed transmissions using two of the electromechanical actuators of FIG. 9.
Figure 13:
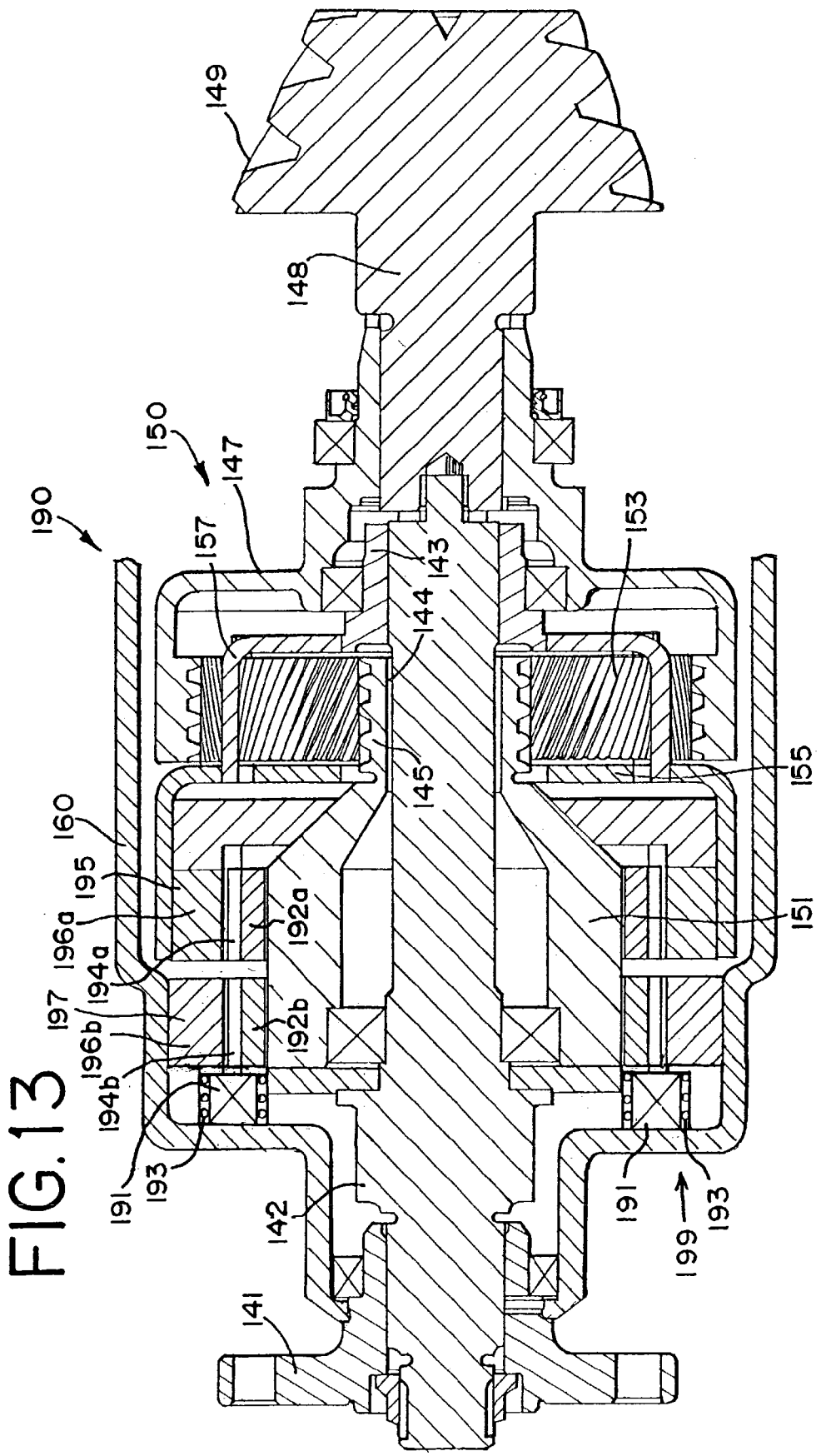

Other embodiments may include a variety of devices for releasably engaging the sun gear extension with a housing of the two-speed transmission. These devices are used in automotive differentials, and include friction cone clutches, ball-and-ramp devices, and solenoids. FIG. 12 illustrates an auxiliary transmission using a ball and ramp device for engaging the electromechanical actuator. In FIG. 12, the two-speed transmission works in the same manner as that described above for FIG. 8. FIG. 13 depicts a solenoid for releasably engaging the transmission.

FIG. 12 is another embodiment of a two speed transmission 140 with an idling electromechanical actuator 180 and a second electromechanical actuator 180 in operable contact with a ball-and-ramp device 185. The electromechanical actuators have inner races 192a, 192b, cages 194a, 194b, and outer races 196a, 196b, along with other internal parts, such as roller elements and springs, as previously described. The inner races 192a, 192b are in rotatable contact with the sun gear extension 151, while outer race 196b is in fixed contact with the housing 160 and outer race 196a is in rotatable contact with carrier 157. The ball and ramp device 185 may include a rotor 181 and a stator 183. With respect to the second electromechanical actuator 180, upon command, rotor 181 may rotate to cause cage 194b to rotate engaging inner race 192b and outer race 196b. Since outer race 196b is splined or otherwise grounded to housing 160, inner race 192b, cage 194b, and outer race 196b are unable to rotate. Thus, sun gear extension 151 and therefore sun gear 145 are also unable to rotate. With the sun gear stationary, the planetary gear system operates as described previously, including planets 153 and ring gear 147.

FIG. 13 depicts another embodiment of a two-speed transmission 190 having two electromechanical actuators 195, 197. In this embodiment, first electromechanical actuator 195 is an electromechanical actuator as previously described, while second actuator 197 includes a solenoid 199. The first and second actuator have inner races 192a, 192b, cages 194a, 194b, and outer races 196a, 196b, along with other parts as previously described. The solenoid 199 comprises a plunger 191 in a rotating track and coil 193. Electric power to the solenoid is provided via slip rings (not shown). Upon actuation, the coil 193 may drive the plunger 191 and rotate it a short angle so that cage 194b causes engagement of inner race 192b with outer race 196b of electromechanical actuator 197 through roller elements 175. As previously described for FIGS. 8 and 12, this causes the sun gear extension 151 and sun gear 145 to cease rotating, engaging the two speed transmission and placing the transmission into underdrive.

Figure 14:
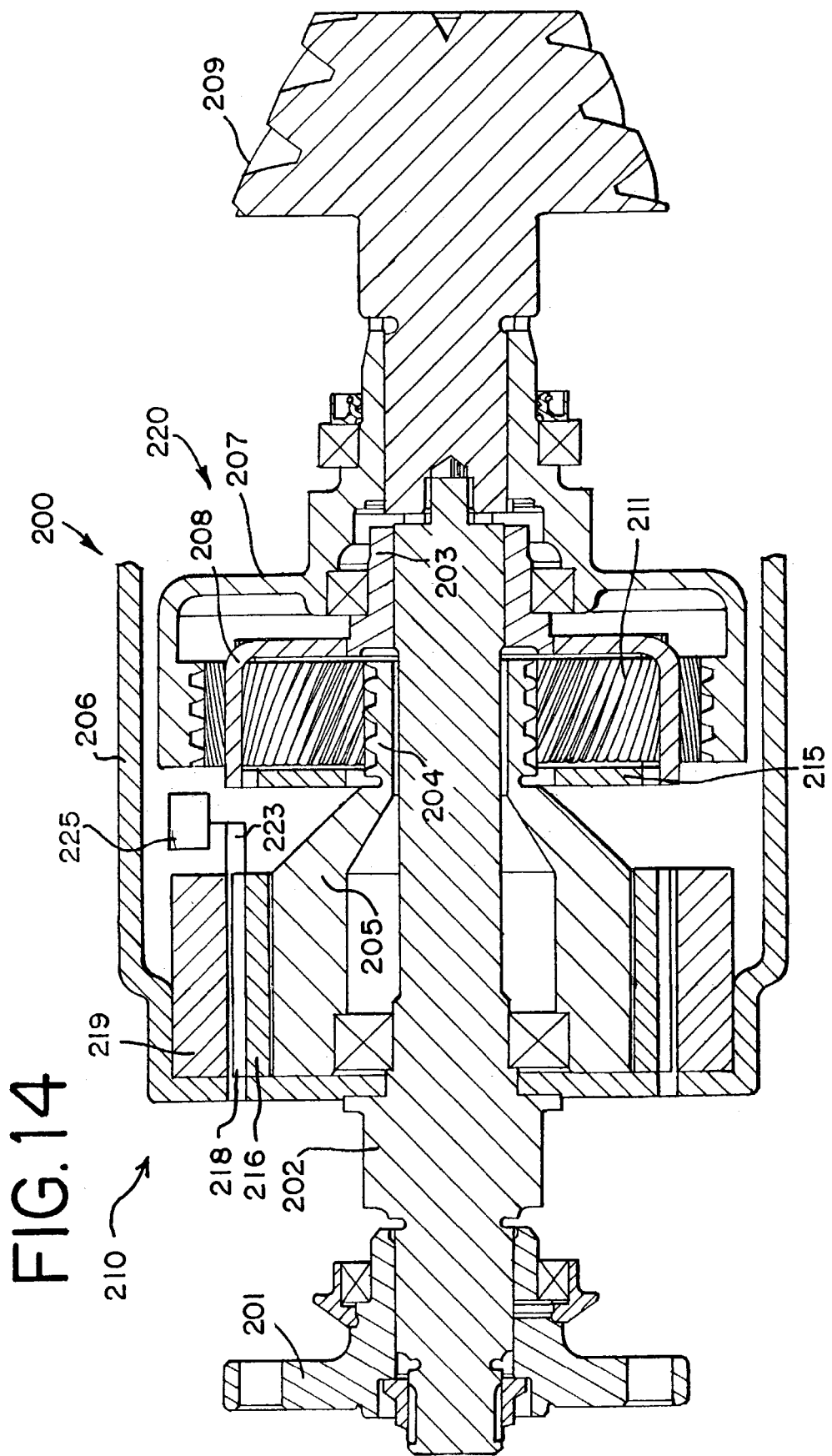
FIG. 14 is a cross-sectional view of a two-speed transmission using a single electromechanical actuator to shift gear ratios.

Another embodiment uses a single electromechanical actuator in a two speed auxiliary transmission. FIG. 14 depicts a two-speed transmission 200 with a single electromechanical actuator 210 and a planetary transmission 220 within housing 206. In this embodiment, there is a flange gear 201 and a drive shaft 202 with drive shaft extension 203, sun gear 204 and sun gear extension 205. The electromechanical actuator 210 may include an inner race 216 in splined connection with sun gear 204 and sun gear extension 205, and may also include cage 218 and outer race 219. Not visible are the internal components, included roller elements, springs and the like, as previously described. This embodiment features a ballscrew 223 driving cage 218 and rotating the cage through an angle of a few degrees in response to controller 225. Upon a signal from controller 225, the ballscrew 223 may rotate the cage 218, causing inner race 216 to lock up with outer race 219, which is grounded to housing 206. This prevents the sun gear 204 and sun gear extension 205 from rotating. Drive shaft 202 and extension 203 continue to rotate, as does planet carrier 208. Planet gears 211 rotate about the sun gear 204 on planet pins 215. The output of the planetary transmission 220 is taken through ring gear 207, driven by the planet gears, and axle pinion gear 209. The ratio between the input speed and the output speed of the transmission is set by the ratio of the planet gears 211 to the ring gear 207 in the planetary transmission. The electromechanical actuator 210 may use any other device that is convenient to rotate the cage and engage the electromechanical actuator, such as a ball-and-ramp mechanism or a solenoid, to engage the housing and thus the planetary transmission.

It is therefore intended that the foregoing description illustrates rather than limits this invention, and that it is the following claims, including all equivalents, which define this invention. Of course, it should be understood that a wide range of changes and modifications may be made to the embodiments and preferences described above. For instance, an overdrive speed range may be used as well as an under-drive range. Accordingly, it is the intention of the applicants to protect all variations and modifications within the valid scope of the present invention. It is intended that the invention be defined by the following claims, including all of the equivalents thereto.

What is claimed is:

1. An electromechanical actuator for engaging a shaft in a power transmission device, the electromechanical actuator comprising:
    a fixedly mounted housing including an inner surface having a cammed profile directed radially inward toward the shaft;
    a plurality of roller elements located within the housing on the cammed profile, each roller contacting an adjacent roller;
    a split ring located around the shaft and within the housing, including a radially outer surface facing the cammed profile, a radially inner surface facing the shaft, and a split extending radially between the inner surface and outer surface;
    an engaging device, for urging the split ring at a location of the split radially inward into engagement against the shaft, forcing two adjacent roller elements angularly apart, and moving the roller elements along the cammed profile radially inward into engagement with the outer surface of the split ring while remaining engaged with the cammed profile.

2. The electromechanical actuator of claim 1 further comprising a plunger, and wherein the engaging device is selected from the group consisting of a solenoid, a cone friction clutch, a ball and ramp device, and a ballscrew.

3. The electromechanical actuator of claim 1 wherein the housing is mounted to a structure selected from the group consisting of an axle housing, a transmission housing, and an automotive frame.

4. The electromechanical actuator of claim 1, wherein the shaft is connected to a planetary transmission and the planetary transmission is connected to a sleeve, the planetary transmission having a first gear ratio when the sleeve rotates and a second gear ratio when rotation of the sleeve is prevented.

5. The electromechanical actuator according to claim 4, wherein the planetary transmission has a first gear input: output speed ratio of 1:1 and a second gear input: output ratio selected from the group consisting of 1.4:1 and 1:1.4.

6. The electromechanical actuator of claim 1, further comprising a plunger moveable radially between adjacent rollers, toward the shaft, and into engagement with the split ring at the location of the split.

7. An actuator for a power transmission device comprising:
    an inner race having a split for connecting with a first drive;
    an outer race for connecting with a second drive; and
    a cage and a plurality of roller elements, the cage and the roller elements being located between the inner and outer races, wherein at least one of an inner surface of the outer race and an outer surface of the inner race is a cammed surface, the inner race having a split extending through a thickness of the inner race, the cammed surface being formed such tat rotation of the cage in either rotary direction about a central axis relative to the inner race and outer race forces each roller element to move circumferentially along the cammed surface and radially into engagement with the other of the an inner surface of the outer race and an outer surface of the inner race while remaining engaged with the cammed surface.

8. The actuator of claim 7, further comprising a feature for driveable engagement by the inner race.

9. The actuator of claim 7, wherein at least one of the inner race and outer race is splined for engagement wit at least one of the shaft and a housing.

10. The actuator of claim 7, further comprising at least one leaf spring in contact with a portion of the outer race for centering the cage.

11. The actuator of claim 7, wherein the cage further comprises a plurality of separating devices for separating the roller elements.

12. The actuator of claim 7, further comprising an engaging device for rotating the cage and engaging the inner race and the outer race, the engaging device selected from the group consisting of a solenoid, a ball-and-ramp device, a cone friction clutch, and a ball-screw.

* * * * *